(12) United States Patent
Parush Tzur et al.

(10) Patent No.: US 11,022,469 B2
(45) Date of Patent: Jun. 1, 2021

(54) CORRECTION OF SENSOR DATA IN A MULTI-SENSOR INTERNET OF THINGS ENVIRONMENT

(71) Applicant: EMC IP Holding Company LLC, Hopkinton, MA (US)

(72) Inventors: Anat Parush Tzur, Beer Sheva (IL); Oshry Ben-Harush, Kibutz Galon (IL); Amihai Savir, Sansana (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 340 days.

(21) Appl. No.: 16/050,239

(22) Filed: Jul. 31, 2018

(65) Prior Publication Data
US 2020/0041316 A1 Feb. 6, 2020

(51) Int. Cl.
*G01D 18/00* (2006.01)
*G01K 15/00* (2006.01)
*G01W 1/02* (2006.01)

(52) U.S. Cl.
CPC ........... *G01D 18/00* (2013.01); *G01K 15/005* (2013.01); *G01W 1/02* (2013.01)

(58) Field of Classification Search
CPC ........ G01D 18/00; G01D 3/022; G01D 3/036; G01D 3/08; G01D 3/10; G01K 15/005; G01K 15/007; G01W 1/02
USPC .................................................. 702/93, 104
See application file for complete search history.

(56) References Cited

U.S. PATENT DOCUMENTS

| | | | |
|---|---|---|---|
| 7,246,024 B2 | 7/2007 | Muramatsu et al. |
| 7,565,229 B2 | 7/2009 | Andres et al. |
| 8,130,094 B2 | 3/2012 | Lu et al. |
| 8,319,623 B2 | 11/2012 | Wallace et al. |
| 8,482,753 B2 | 7/2013 | Urasawa et al. |
| 9,719,866 B2 | 8/2017 | Kobayashi et al. |
| 10,086,782 B1 | 10/2018 | Konrady et al. |
| 10,163,038 B2 | 12/2018 | Wang et al. |
| 10,262,474 B2 | 4/2019 | Gortsas et al. |

(Continued)

OTHER PUBLICATIONS

U.S. Appl. No. 16/024,759 entitled, "Detection of Malfunctioning Sensors in a Multi-Sensor Internet of Things Environment", filed Jun. 30, 2018.

(Continued)

*Primary Examiner* — John H Le
(74) *Attorney, Agent, or Firm* — Ryan, Mason & Lewis, LLP (57) ABSTRACT

Techniques are provided for correcting sensor data in a multi-sensor environment. An exemplary method comprises obtaining sensor data from a first sensor; applying an anomaly detection technique to detect an anomaly in the sensor data from the first sensor based on additional sensor data from one or more of the first sensor and at least one additional sensor in proximity to the first sensor; and correcting the anomalous sensor data from the first sensor using additional sensor data from one or more of the first sensor and the at least one additional sensor. In some embodiments, additional sensor data from a plurality of neighboring sensors is used to predict the sensor data from the first sensor. The anomalous sensor data is optionally corrected substantially close in time to the detection of the anomaly in the sensor data.

20 Claims, 7 Drawing Sheets

(56) References Cited

U.S. PATENT DOCUMENTS

| | | | | |
|---|---|---|---|---|
| 10,499,124 | B1* | 12/2019 | Natanzon | H04L 41/065 |
| 10,725,463 | B1* | 7/2020 | Dixit | G06N 3/04 |
| 10,841,020 | B2* | 11/2020 | Zhou | H04B 17/21 |
| 2011/0060215 | A1 | 3/2011 | Tupin, Jr. et al. | |
| 2011/0184676 | A1 | 7/2011 | Gershinsky et al. | |
| 2016/0299256 | A1 | 10/2016 | Modi et al. | |
| 2016/0330225 | A1* | 11/2016 | Kroyzer | G06N 20/00 |
| 2017/0111210 | A1 | 4/2017 | Chakrobartty et al. | |
| 2017/0284903 | A1* | 10/2017 | Anderson | G01M 99/008 |
| 2017/0339035 | A1* | 11/2017 | Naiki | H04L 67/10 |
| 2019/0033850 | A1* | 1/2019 | B R | G05B 17/02 |
| 2019/0213446 | A1* | 7/2019 | Tsou | G06K 9/6257 |
| 2019/0238241 | A1* | 8/2019 | Zhou | G01D 3/022 |

OTHER PUBLICATIONS

Savaram Ravindra, "IoT Applications in Agriculture, IOT for All" downloaded on Jul. 30, 2018 from https://www.iotforall.com/iot-applications-in-agriculture/.

"An In-Depth Look at IoT in Agriculture & Smart Framing Solutions", downloaded on Jul. 30, 2018 from https://www.link-labs.com/blog/iot-agriculture.

Kin et al., "Video Compression Using Recurrent Convolutional Neural Networks", downloaded on Jul. 30, 2018 from from http://cs231n.stanford.edu/reports/2017/pdfs/423.pdf.

U.S. Appl. No. 15/959,592 entitled, "Data Management Policies for Internet of Things Components", filed Apr. 23, 2018.

* cited by examiner

Sensor Data Correction Policy 400

☐ Similar Sensor Type Rule(s) 410
☐ Proximate Sensor Rule(s) 420
☐ Environmental Knowledge Sensor Rule(s) 430
☐ Malfunctioning Sensor Handling Rules 440

CORRECTION OF SENSOR DATA IN A MULTI-SENSOR INTERNET OF THINGS ENVIRONMENT

FIELD

The field relates generally to the processing of sensor data.

BACKGROUND

An Internet of Things (IoT) network typically comprises distributed physical devices, such as vehicles and sensors, that exchange data over the network. With the proliferation of IoT networks, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

A number of IoT management frameworks exist for managing devices that generate and process sensor data. As society grows increasingly dependent on such sensor data, the proper management and collection of the gathered sensor data also becomes important. Sensors may malfunction and report incorrect values, potentially impairing the reliability of the gathered sensor data. A failing thermostat, for example, may report an incorrect temperature value, or no temperature value at all.

A need exists for techniques for correcting sensor data in a multi-sensor IoT environment.

SUMMARY

In one embodiment, a method comprises obtaining sensor data from a first sensor; applying an anomaly detection technique to detect an anomaly in the sensor data from the first sensor based on additional sensor data from one or more of the first sensor and at least one additional sensor in proximity to the first sensor; and correcting the anomalous sensor data from the first sensor using additional sensor data from one or more of the first sensor and the at least one additional sensor.

In some embodiments, the at least one additional sensor in proximity to the first sensor comprises a plurality of additional sensors that satisfy one or more neighboring criteria with respect to the first sensor and wherein the additional sensor data from the plurality of additional sensors is used to predict the sensor data from the first sensor. In one or more embodiments, the anomalous sensor data is corrected substantially close in time to the detection of the anomaly in the sensor data.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function. One or more embodiments of the disclosure provide methods, apparatus and computer program products for correcting anomalous sensor data in a multi-sensor IoT environment.

In one or more embodiments, the disclosed sensor data correction techniques employ anomaly detection techniques to detect an anomaly in the sensor data from a first sensor based on additional sensor data from the first sensor and/or from at least one additional sensor in proximity to the first sensor. The additional sensors can be identified, for example, based on predefined sensor proximity or neighboring criteria. The detected anomalous sensor data comprises outlier sensor readings or other unreliable sensor readings. In this manner, the detected anomalous sensor data can be corrected to improve the overall IoT system accuracy and/or reliability. One or more embodiments leverage multi-sensor information and optionally employ cross-sensor distributed algorithms to correct the anomalous sensor data of one or more malfunctioning sensors.

One or more embodiments employ machine learning techniques to identify sensors satisfying predefined sensor proximity criteria and to compare the sensor readings from such identified sensors to detect anomalous sensor data. For example, the exemplary machine learning techniques can use sensors within proximity of one another to predict whether obtained sensor information comprises outliers requiring a correction.

In at least one embodiment, the disclosed sensor data correction techniques detect anomalous sensor data in multi-sensor data and correct the anomalous sensor data using additional sensor data from the failing sensor and/or from one or more additional sensors. One or more aspects of the disclosure recognize that sensor readings from multiple sensors can be used to determine whether an outlier reading is a problem in the IoT system or a problem with a particular sensor, for example. By leveraging sensor readings from multiple similar and/or proximate sensors, based on, for example, predefined sensor similarity and/or proximity criteria (such as a comparison of sensor readings from multiple neighboring sensors in a sensor array, as discussed further below in conjunction with FIG. 2), anomalous sensor data can be identified and corrected.

In some embodiments, the disclosed sensor data correction techniques are based on a proximity between sensors, such as neighboring agricultural sensors. It has been found that sensors with close geographical proximity tend to create similar or even substantially identical sensor data. By creating localized dynamic distributed sensor networks, time, space and/or sensor type information among multiple sensors can be coordinated and thereby allow outlier sensor data to be identified and corrected.

In one or more embodiments, holistic sensor data correction policies are provided for correcting anomalous sensor data in an IoT system. The disclosed sensor data correction policies connect IoT components, their sensor data and corresponding metadata in a way that allows advanced sensor data correction techniques to be applied across a distributed network of sensor devices within an IoT system. One or more aspects of the present disclosure recognize that complex IoT systems have sensor data correction needs, and the failure to address these needs may result in degraded system performance or a loss of service.

Figure 1:
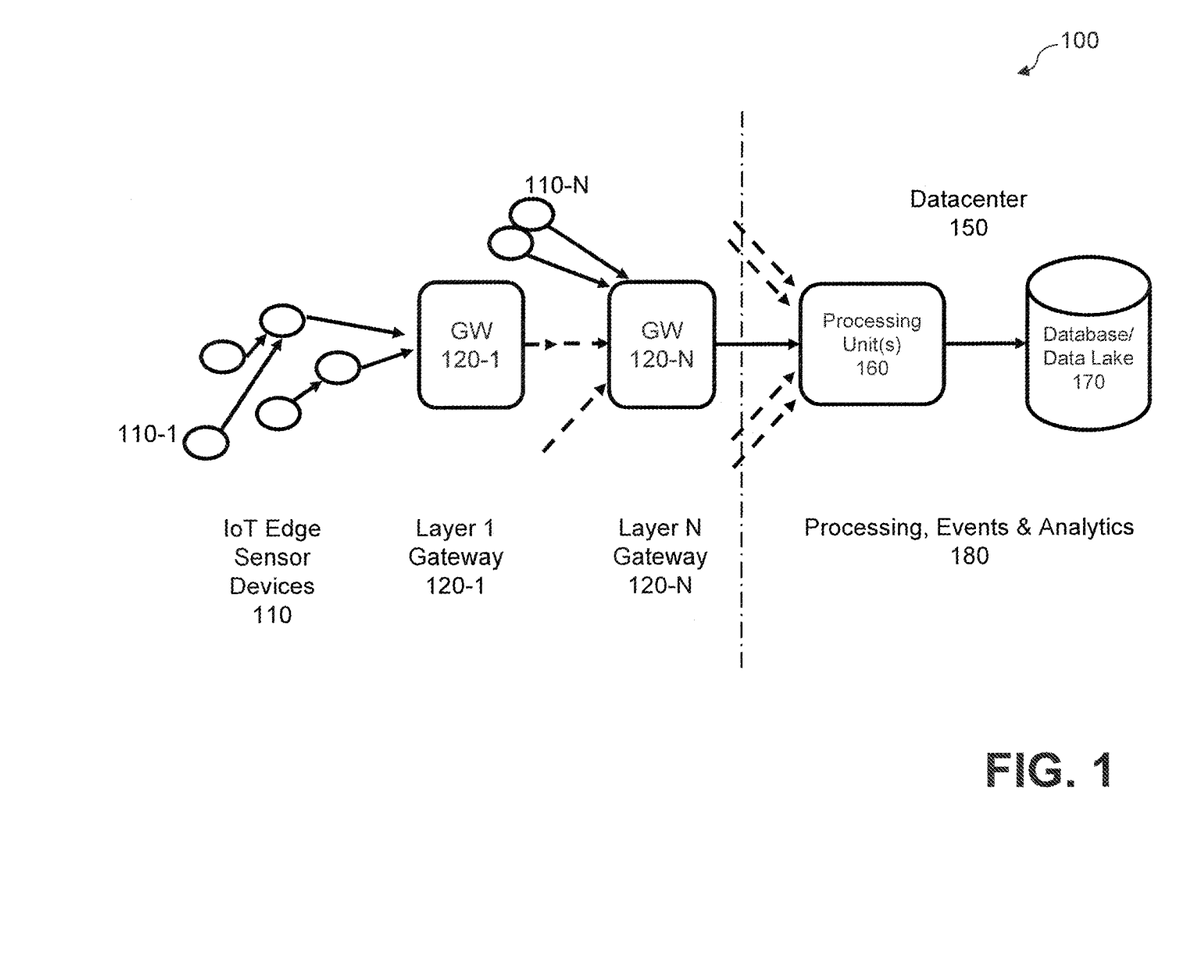
FIG. 1 illustrates an exemplary IoT system, according to one embodiment of the disclosure.

FIG. 1 illustrates an exemplary IoT system 100, according to one embodiment of the disclosure. Generally, IoT systems, such as the exemplary IoT system 100, typically consolidate edge devices to gateways and then to a central backend datacenter where most of the processing is done. There can be several layers of gateways. New edge devices are introduced and others retire constantly and the exemplary IoT system 100 needs to handle these topology changes.

As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. For example, a sensor array can be treated as a first gateway layer 110-1 to the multiple sensors that exist within the sensor array. In some embodiments, vehicles are connected to a regional edge layer (not explicitly shown in FIG. 1), where the region can be, for example, a cell of a cellular network. The regional gateways can be connected in some embodiments to Country clouds/gateways that are connected to a global cloud.

One or more aspects of the present disclosure recognize that the sensor data generated by multiple sensors of a sensor array, such as an array of agriculture sensors, can be used to identify and correct anomalous sensor data.

While gateways 120 are employed in the exemplary embodiment of FIG. 1, the gateways 120 are not mandatory. Gateways 120 are prevalent in numerous implementations, as networking capabilities of edge devices 110 are usually local in nature (e.g., power or connectivity) and the gateway 120 is used to connect to the Internet (not shown in FIG. 1).

The sensors 110 can be, for example, sensors designed for a specific purpose, such as thermometers, rain gauges and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: unique identifier (ID), geo-location, and clock timestamp (ongoing).

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

While one or more exemplary embodiments are described herein using sensor devices 110 associated with an array of agriculture sensors, any sensors can be employed, as would be apparent to a person of ordinary skill in the art.

Figure 2:
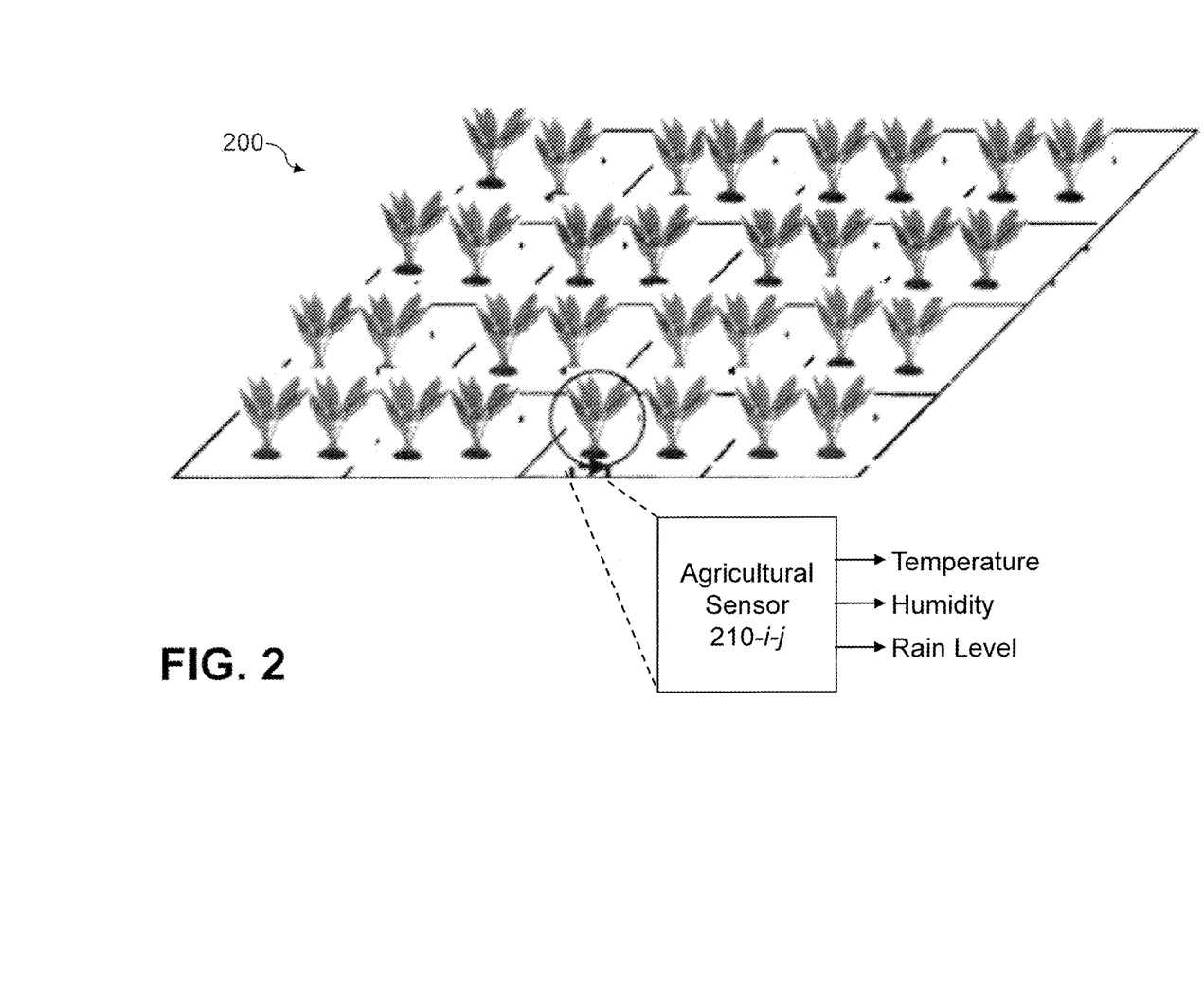
FIG. 2 illustrates an exemplary sensor array, according to an embodiment.

FIG. 2 illustrates an exemplary sensor array 200, according to an embodiment. In an exemplary agricultural environment, multiple sensors, such as an exemplary agricultural sensor 210-$i$-$j$, may be positioned in a sensor array 200, for example, with a semi-regular pattern or when the location of each sensor 210 in the sensor array 200 is otherwise known. In some agricultural environments, each plant may have an associated sensor 210. All of the sensors 210 in the array 200 optionally transmit the sensor data to the gateway 120, which transmits the data to the datacenter 150. In the example of FIG. 2, the exemplary agricultural sensor 210-$i$-$j$ measures temperature, humidity and rain level.

In order to cover a large field in some agricultural domains, many sensors may be needed. A smart agricultural field, for example, may have a humidity sensor every meter. Thus, a field having a size of one square kilometer, for example, will have approximately one million sensors. The agricultural sensors are relatively cheap, on the order of cents per sensor. One problem with modeling and tracking IoT signals using machine learning approaches, for example, comes from the noise and robustness of the sensors, especially when a malfunctioning sensor generates wrong measurements. This affects the model accuracy especially when so many sensors are applied to the machine learning model.

Among other benefits, the disclosed techniques for correcting anomalous sensor data can compensate for or otherwise mitigate the inaccurate readings of some inexpensive sensors.

While the exemplary sensor array 200 is illustrated in the context of an exemplary agricultural environment, other suitable multi sensor environments include sensors inside large datacenters with, for example, tens of thousands of servers, utilizing, for example, hundreds of thousands of sensors to measure, for example, temperature and humidity of each server as well as the overall datacenter environment. In addition, it is noted that a sensor array 200 comprised of sensors 210 in rows and columns is employed for ease of illustration, and such a regular pattern is not a requirement, as would be apparent to a person of ordinary skill in the art. Rather, the disclosed sensor data correction techniques can be employed in any multi-sensor environment where the location of the sensors is known.

Figure 3:
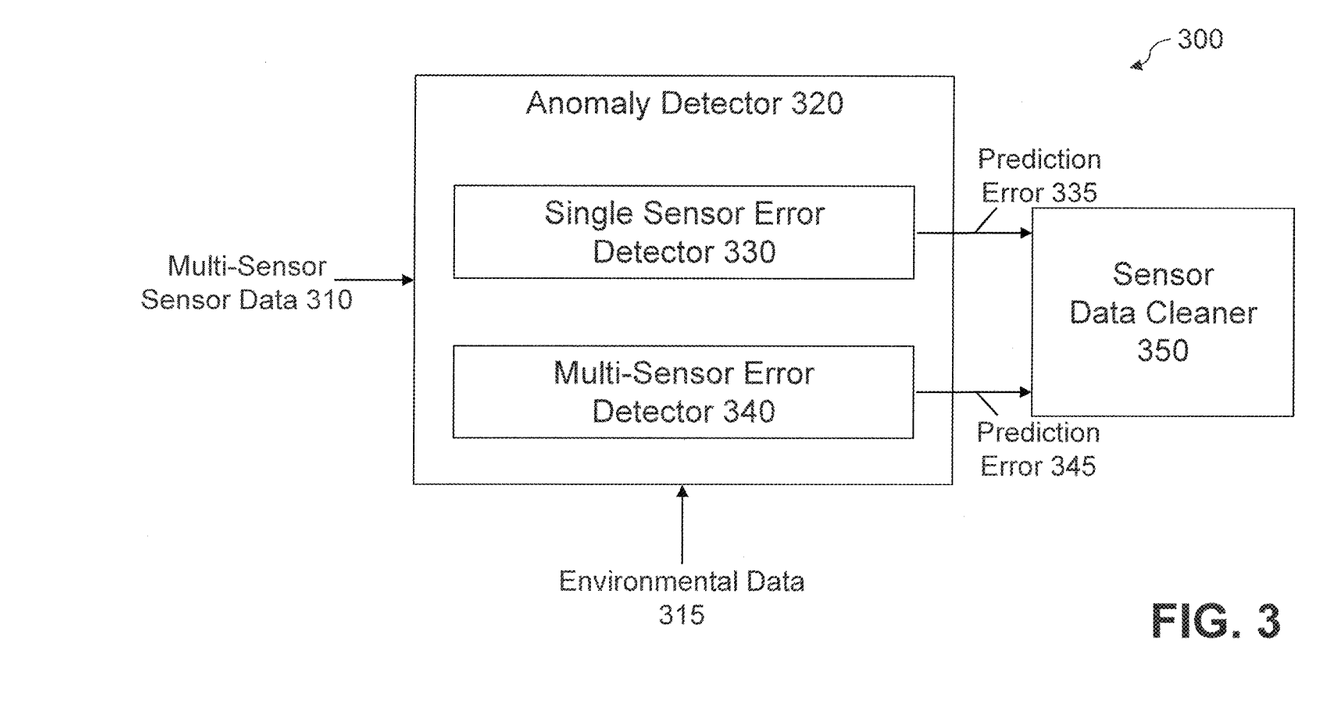
FIG. 3 illustrates an exemplary multi-level data correction IoT environment, according to some embodiments of the disclosure.

FIG. 3 illustrates an exemplary multi-level data correction IoT environment 300, according to some embodiments of the disclosure. Generally, the exemplary multi-level data correction IoT environment 300 implements multiple levels of data error detection and data cleaning that will improve the data quality and save a significant amount of time and money. In this manner, the exemplary multi-level data correction IoT environment 300 can correct inaccurate sensor measurements before they are applied to a machine learning model and/or an artificial intelligence model, for example, during a training period which would cause the model(s) to produce inaccurate predictions or outcomes that may lead to a wrong decision.

As shown in FIG. 3, multi-sensor sensor data 310 (for example, from a plurality of sensors 210 in the sensor array 200 of FIG. 2) is applied to the exemplary multi-level data correction IoT environment 300. The exemplary multi-level data correction IoT environment 300 comprises an anomaly detector 320 and a sensor data cleaner 350. The exemplary anomaly detector 320 comprises a single sensor anomaly detector 330 and a multi-sensor anomaly detector 340.

In some embodiments, the single sensor anomaly detector 330 recognizes that as each sensor 210 transmits the sensor data to the gateway 120, the sensor measurements will change continuously but typically by only small amounts over time. The single sensor anomaly detector 330 performs a prediction to detect an anomaly in the sensor data from a given sensor based on additional sensor data from the given sensor.

The exemplary single sensor anomaly detector 330 implements a prediction algorithm, such as a Holt-Winters predictor and/or an ARIMA (autoregressive integrated moving average) predictor, to detect anomalies in the sensor data signal. In further variations, the prediction models employed by the single sensor anomaly detector 330 comprise, for example, a Gaussian mixture model and/or time series models that take into account the seasonality, trend and bias of the sensor data from a single sensor 210. The difference 335 between the actual sensor data values and the predicted sensor data values are applied to the sensor data cleaner 350, discussed below.

The multi-sensor anomaly detector 340 recognizes that, in some embodiments, the sensor data 310 from multiple sensors can be viewed as an image. A digital charge-coupled device (CCD) camera, for example, can be viewed as a matrix of sensors. In a similar manner, the sensor data 310 from multiple sensors 210 at the gateway 120, can be expected to provide a result that is smooth (for example, humidity or temperature). Thus, the exemplary multi-sensor anomaly detector 340 leverages the data of the surrounding sensors 210 in one or more embodiments and uses the multi-sensor data 310 as a predictor for a particular sensor, such as a central sensor. For example, for an exemplary grid of nine sensors (three sensors by three sensors) in the sensor array 200, the sensor values of eight sensors surrounding a given sensor 210 can be used to predict the value of the central given sensor 210. The exemplary multi-sensor anomaly detector 340 can implement a regression model, such as a Support Vector Regression (SVR), to learn a model from historical data that can be used to predict the value of the target variable. The difference 345 between the actual sensor data values and the predicted sensor data values are applied to the sensor data cleaner 350, discussed below.

Thus, the exemplary multi-sensor anomaly detector 340, in some embodiments, receives sensor data from multiple sensors that satisfy one or more neighboring criteria with respect to a given sensor. The sensor data from the neighboring additional sensors is used to predict the sensor data of the given sensor.

In some embodiments, additional environmental knowledge 315 may be available to improve the predictions performed by the exemplary anomaly detector 320. For example, the gateway 120, a predefined source of information or another portion of the system may know of global changes that may occur and affect the sensor measurements. Thus, the additional environmental knowledge 315 provides a mechanism to leverage the global changes in the prediction algorithms performed by the single sensor anomaly detector 330 and/or the multi-sensor anomaly detector 340 to improve the predictions and achieve higher accuracy and better data correction.

For example, the gateway 120 may know that the watering system of an agricultural environment will be turned on and thus humidity values will change. This additional environmental knowledge 315 can be used as metadata for the regression models of the multi-sensor anomaly detector 340, for example, as the additional environmental knowledge 315 identifies which locations of the field will get water and when. Another example is a weather forecast, such as a rain forecast, can also provide additional environmental knowledge 315 about expected humidity that can be integrated into the model(s).

In one exemplary implementation, the single sensor anomaly detector 330 can use historical data to predict the sensor data for a particular sensor at a given time, and the multi-sensor anomaly detector 340 can use actual sensor data of the neighboring sensors to predict the sensor data for the particular sensor at the same given time. In the event of a fire, for example, the single sensor anomaly detector 330 may classify the sensor data (e.g., a higher temperature reading) of particular sensor at the given time as an anomaly. The multi-sensor anomaly detector 340, on the other hand, will use the actual sensor data of the neighboring sensors, which have similarly high values as the particular sensor, to predict the sensor data for the particular sensor at the same given time. Thus, the multi-sensor anomaly detector 340 analysis will indicate that the sensor data of the particular sensor is not an anomaly or an outlier.

As noted above, the sensor data cleaner 350 will receive the difference values 335, 345 from the single sensor anomaly detector 330 and the multi-sensor anomaly detector 340, respectively. In one or more embodiments, the sensor data cleaner 350 uses the difference values 335, 345 from both approaches to determine whether an obtained actual sensor value is anomalous sensor data indicating an anomaly. For example, the sensor data cleaner 350 can classify a given sensor reading as anomalous sensor data when the predictions of both the single sensor anomaly detector 330 and the multi-sensor anomaly detector 340 identify the given sensor reading as anomalous sensor data (e.g., requiring agreement from the two sources). In further variations, the sensor data cleaner 350 can learn specific weights for the predictions of the single sensor anomaly detector 330 and the multi-sensor anomaly detector 340, for example, using labeled training data or a control and feedback loop, to employ reinforcement learning. In addition, since the gateway 120 often has knowledge from multiple sensors 210, this knowledge can be used to predict a future output of a sensor. Thus, a predicted sensor value can be propagated back from the gateway 120 to a given sensor 210, to allow the given sensor 210 to produce a better prediction for future results and thus use less bandwidth to send the actual sensor measurements.

In the event that sensor data is classified as anomalous sensor data, in one or more embodiments, the sensor data cleaner 350 will correct the anomalous sensor data, for example, using an average or a weighted average of the predictions generated by the single sensor anomaly detector 330 and the multi-sensor anomaly detector 340 to obtain an aggregated sensor value.

In some embodiments, the sensor data cleaner 350 will correct the anomalous sensor data substantially close in time to detection of the anomalous sensor data.

While the exemplary embodiment of FIG. 3 illustrates the anomaly detector 320 and the sensor data cleaner 350 as distinct units, the functionality described herein for the anomaly detector 320 and the sensor data cleaner 350 can be implemented as a single functional unit, as would be apparent to a person of ordinary skill in the art.

For additional techniques for identifying a malfunctioning sensor and/or anomalous sensor data, see, for example, U.S. patent application Ser. No. 16/024,759 (now U.S. Pat. No. 10,499,124), filed Jun. 30, 2018, entitled "Detection of Malfunctioning Sensors in a Multi-Sensor Internet of Things Environment," incorporated by reference herein in its entirety.

Figure 4:
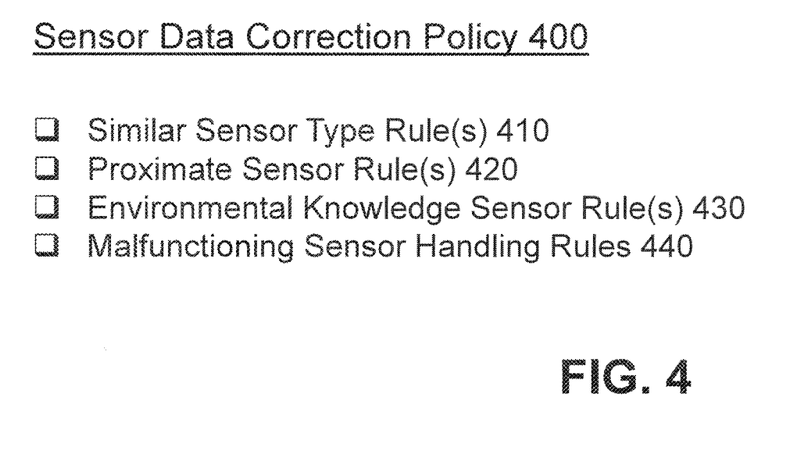
FIG. 4 illustrates an exemplary sensor data correction policy, according to some embodiments.

FIG. 4 illustrates an exemplary sensor data correction policy 400, according to some embodiments. Generally, the exemplary sensor data correction policy 400 defines how the sensor data of various IoT sensor devices 110 of the exemplary IoT system 100 of FIG. 1 can be compared to identify and correct anomalous sensor data. As noted above, in some embodiments, the disclosed multi-sensor sensor data correction techniques compare sensor data from sensors satisfying predefined sensor similarity criteria and/or predefined sensor proximity criteria to detect outlier sensor readings or other unreliable sensor readings. The exemplary predefined sensor similarity criteria and/or predefined sensor proximity criteria can be specified as part of the exemplary sensor data correction policy 400.

In one or more embodiments, anomalous sensor data of a first malfunctioning sensor is identified based on a comparison of the sensor data of the first sensor with the historical sensor data of the first sensor and/or sensor data obtained from one or more additional sensors. The one or more additional sensors are identified in some embodiments based on one or more of a location and sensor type of the additional sensors relative to a location and/or a sensor type of the first sensor, as specified, for example, in the exemplary sensor data correction policy 400.

As shown in FIG. 4, the exemplary sensor data correction policy 400 comprises one or more similar sensor type rule(s) 410; one or more proximate sensor rule(s) 420; one or more environmental knowledge sensor rule(s) 430; and/or one or more malfunctioning sensor handling rules 440.

In some embodiments the similar sensor type rule(s) 410 can specify that the first sensor and the additional sensor(s) have a predefined substantially similar sensor type. In at least one embodiment, the similar sensor type rule(s) 410 are employed to specify when two sensors are of a sufficiently similar type to allow the sensor data of one sensor to be used to correct sensor data of another sensor. For example, the similar sensor type rule(s) 410 can specify that the first sensor comprises a first predefined sensor type and the one or more additional sensors comprise one or more additional predefined sensor types. It is noted that the similar sensor type rule(s) 410 do not need to require that the sensors are of the same type. The similar sensor type rule(s) 410 may require that the sensors measure comparable information. For example, an infrared camera can estimate temperatures and verify whether thermostat sensors are taking accurate temperature measurements.

In some embodiments, the proximate sensor rule(s) 420 can specify that the first sensor and the additional sensor(s) have a predefined substantially similar sensor location. For example, the proximate sensor rule(s) 420 can specify that the additional sensor(s) surround the first sensor and satisfy predefined neighboring criteria. In at least one embodiment, the proximate sensor type rule(s) 420 are employed to specify when two sensors are sufficiently close to allow a data correction in accordance with the disclosed data correction techniques.

One or more aspects of the disclosure recognize that sensors of the same or similar sensor type, located at the same or similar geo-location, at the same time or a similar time, will often measure substantially the same value. Thus, the similar sensor type rule(s) 410 and the proximate sensor rule(s) 420 can optionally be combined, for example, to compare sensor data from sensors of similar sensor types located at similar geo-locations (and optionally at the same time or a similar time). Multiple thermostats, for example, will measure temperatures that should be very similar in close locations (unless, of course, one of the sensors had a reason for the temperature change).

In some embodiments, the environmental knowledge sensor rule(s) 430 can specify one or more external sources of environmental information or environmental data 315 that can be used to validate and correct sensor readings. For example, a humidity value can be measured by an IoT humidity sensor (e.g., a humidistat sensor) at a particular location, which can be compared to an estimated humidity value for the particular location obtained, for example, from a weather forecast or another predefined data source.

In some embodiments, the disclosed sensor data correction techniques detect one or more malfunctioning sensors (or other reasons for providing anomalous sensor data) and implement one or more predefined remedial actions when a malfunctioning sensor is identified. The malfunctioning sensor handling rules 440 optionally specify one or more predefined remedial steps for a given malfunctioning sensor based on one or more predefined policies. For example, the predefined steps of one or more malfunctioning sensor handling rules 440 may specify one or more of the following possible remedial actions:

auto-calibrate (e.g., use data from other data sources for calibration);
reset power on a sensor;
initiate an auto-clean mechanism for glass lens, for example; and/or
notify user(s) (e.g., with directions for a repair; location and identifiers of malfunctioning sensor(s); and/or location of a suitable service center and/or vendor to repair, replace and/or calibrate malfunctioning sensor).

The sensor data correction policy 400 optionally also specifies a predefined handling of the sensor data obtained from a malfunction sensor. For example, when a malfunction is detected in one or more sensors using the disclosed techniques, the sensor data correction policy 400 may specify that samples from the one or more malfunctioning sensors are corrected or discarded until the malfunctioning sensors are repaired or replaced.

The policies can be defined according to geography (regionally, for example), over time (e.g., perform malfunction detection and/or remedial measures at night) or dynamically (e.g., in response to a detected sensor malfunction). Sensors 110 are optionally updated with the sensor data correction policies 400, as those may change over time/location and the sensors can adapt accordingly.

In some embodiments, the exemplary sensor data correction policy 400 optionally detects anomalous sensor data using one or more of the similar sensor type rule(s) 410; proximate sensor rule(s) 420; and/or environmental knowledge sensor rule(s) 430 of the sensor data correction policy 400.

When anomalous sensor data is detected, the exemplary sensor data correction policy 400 may specify, for example, that the predefined malfunctioning sensor handling rules 440 are implemented.

In one or more embodiments, the sensor data correction algorithms will have generic APIs for specifying one or more of the similar sensor type rule(s) 410; proximate sensor rule(s) 420; and/or environmental knowledge sensor rule(s) 430 of the sensor data correction policy 400.

Figure 5:
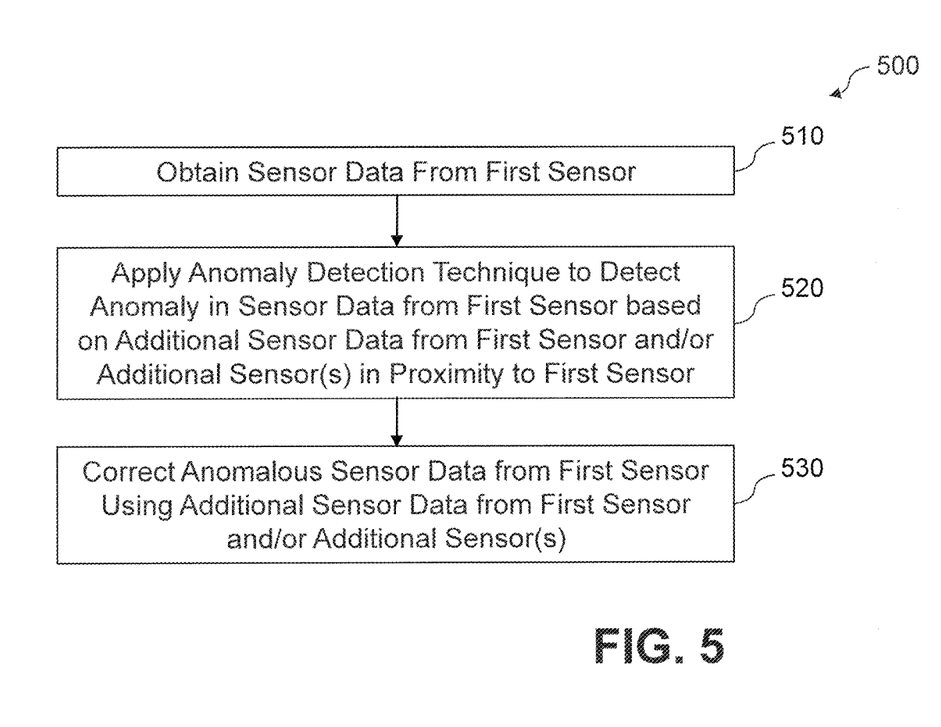
FIG. 5 is a flow chart illustrating a sensor data correction process, according to an embodiment of the disclosure.

FIG. 5 is a flow chart illustrating a sensor data correction process 500, according to an embodiment of the disclosure. The exemplary sensor data correction process 500 is implemented by a given IoT component in the IoT system 100 of FIG. 1 (e.g., the techniques can be applied at any level, such as for multiple sensors within an area, or by gateways, concentrators, hubs or other aggregation devices of the same type, or a different type). As shown in FIG. 5, during step 510, the exemplary sensor data correction process 500 initially obtains sensor data from a first sensor. During step 520, the sensor data correction process 500 applies an anomaly detection technique to detect an anomaly in the sensor data from the first sensor based on additional sensor data from one or more of the first sensor and at least one additional sensor in proximity to the first sensor.

The exemplary sensor data correction process 500 corrects the anomalous sensor data from the first sensor during step 530 using additional sensor data from the first sensor and/or at least one additional sensor.

For a more detailed discussion of suitable techniques for using policies and propagating the policies throughout the IoT system 100, see, for example, U.S. patent application Ser. No. 15/959,592 (now U.S. Pat. No. 10,958,536), filed Apr. 23, 2018, entitled "Data Management Policies for Internet of Things Components," incorporated by reference herein in its entirety.

One or more embodiments of the disclosed sensor data correction techniques detect anomalous sensor data by comparing the sensor readings of one or more sensors that satisfy one or more of sensor similarity, spatial and/or temporal criteria and other aspects.

One or more embodiments of the disclosure provide improved methods, apparatus and computer program products for sensor data correction for various components of an IoT system. The foregoing applications and associated embodiments should be considered as illustrative only, and numerous other embodiments can be configured using the techniques disclosed herein, in a wide variety of different applications.

It should also be understood that the disclosed techniques for sensor data correction, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for implementing sensor data correction policies for various components of an IoT system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a sensor data correction engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a sensor data correction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
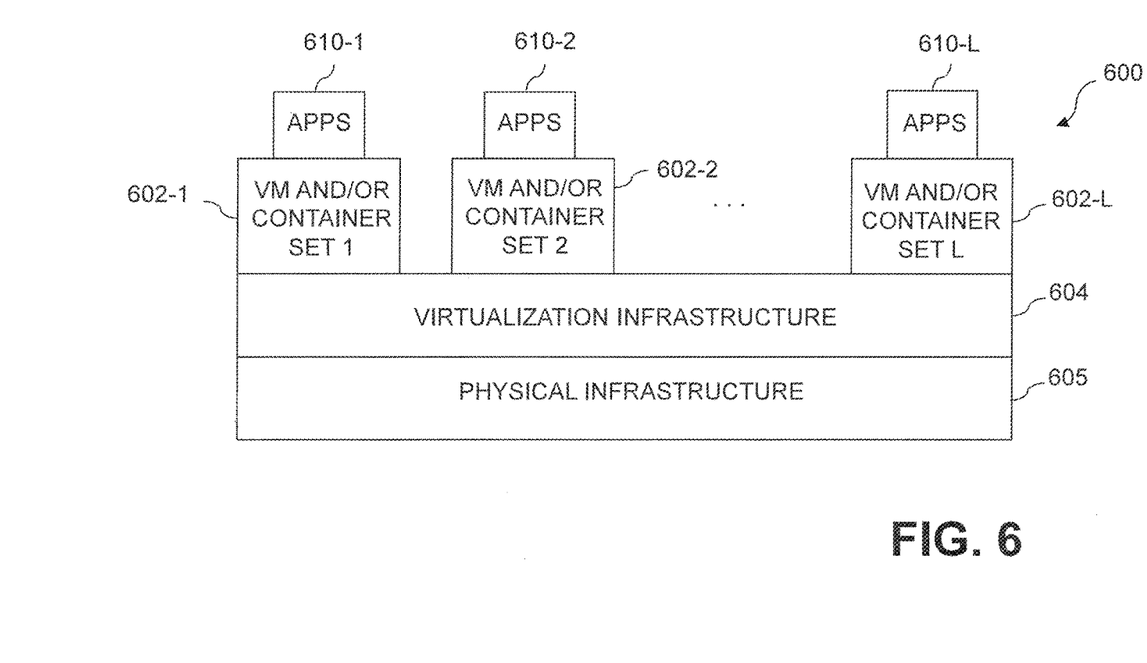
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the disclosed sensor data correction system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide sensor data correction functionality of the type described above for one or more processes running on a given one of the VMs. For example, each of the VMs can implement sensor data correction control logic and associated sensor data correction functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide sensor data correction functionality of the type described above for one or more processes running on different ones of the containers. For example, a container host device supporting multiple containers of one or more container sets can implement one or more instances of sensor data correction control logic and functions.

As is apparent from the above, one or more of the processing modules or other components of the disclosed sensor data correction system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
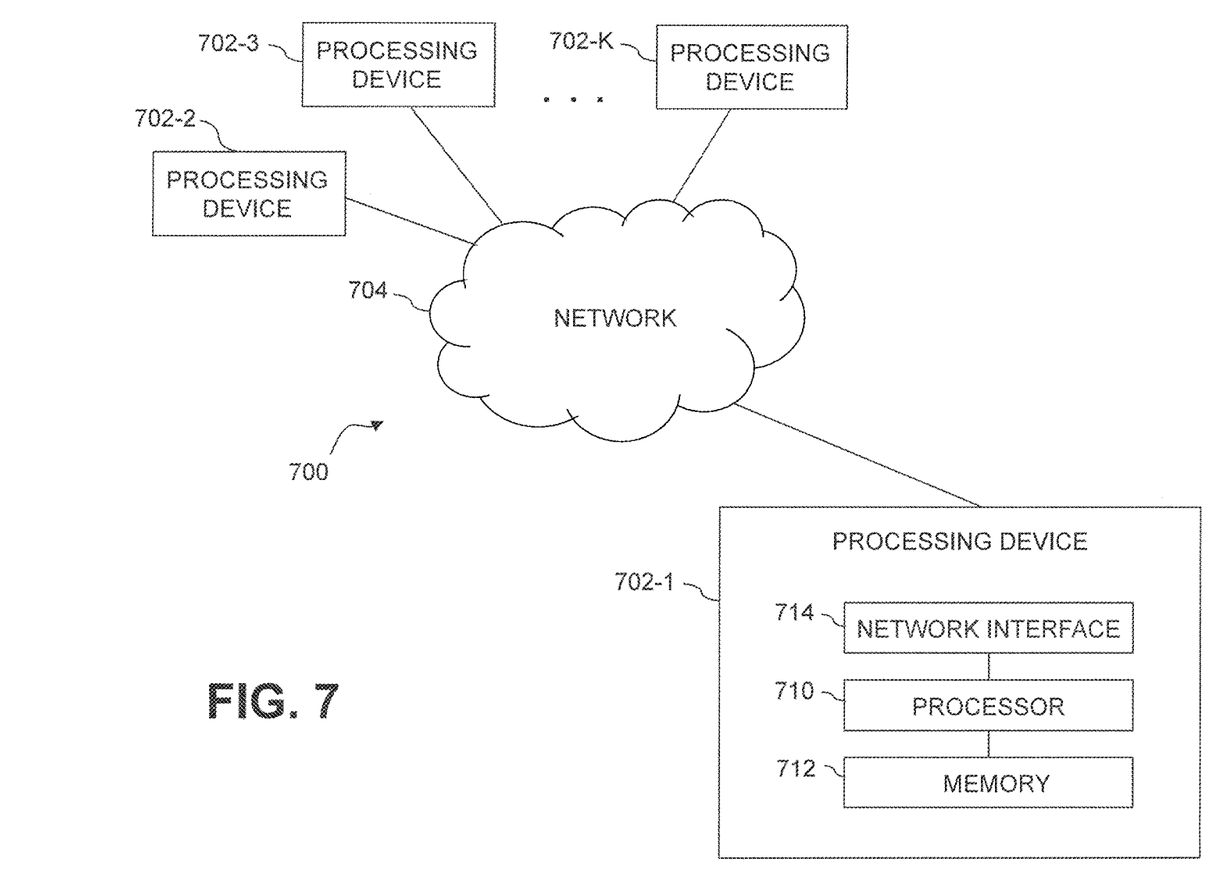
FIG. 7 illustrates another exemplary processing platform that may be used to implement at least a portion of one or more embodiments of the disclosure.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodi-

What is claimed is:

1. A method, comprising:
obtaining sensor data from a first sensor;
applying, by at least one processing device, an anomaly detection technique to detect one or more anomalous sensor values in the sensor data from the first sensor based on additional sensor data from one or more of the first sensor and at least one additional sensor in proximity to the first sensor, wherein a given anomalous sensor value in the sensor data from the first sensor is detected by evaluating (i) a first difference between a first predicted sensor value for the first sensor based at least in part on historical data from the first sensor and a measured sensor value from the first sensor, and (ii) a second difference between a second predicted sensor value for the first sensor based at least in part on at least one measured sensor value from the at least one additional sensor and the measured sensor value from the first sensor; and
correcting, by the at least one processing device, at least one of the one or more anomalous sensor values in the sensor data from the first sensor using additional sensor data from one or more of the first sensor and the at least one additional sensor.

2. The method of claim 1, wherein the anomaly detection technique employs a prediction method to detect the anomaly in the sensor data from the first sensor based on the additional sensor data from the first sensor.

3. The method of claim 1, wherein the at least one additional sensor in proximity to the first sensor comprises a plurality of additional sensors that satisfy one or more neighboring criteria with respect to the first sensor and wherein the additional sensor data from the plurality of additional sensors is used to predict the sensor data from the first sensor.

4. The method of claim 1, wherein the first sensor and the at least one additional sensor comprise sensors that have a substantially similar sensor type and a substantially similar sensor location.

5. The method of claim 1, wherein the step of applying the anomaly detection technique to detect the one or more anomalous sensor values in the sensor data further comprises estimating a value of the sensor data from the first sensor based on a predefined source of information.

6. The method of claim 1, wherein the step of correcting the anomalous sensor data is performed substantially close in time to the step of applying the anomaly detection technique to detect the anomaly in the sensor data.

7. The method of claim 1, wherein the correcting the one or more anomalous values in the sensor data comprises determining at least one corrected sensor value based at least in part on a difference between a predicted sensor value and a measured sensor value.

8. The method of claim 1, wherein the given anomalous sensor value in the sensor data from the first sensor is classified as anomalous in response to both the first difference and the second difference indicating an anomaly.

9. The method of claim 1, wherein the correcting the one or more anomalous sensor values in the sensor data comprises using a weighted average of the first predicted sensor value and the second predicted sensor value.

10. A system, comprising:
a memory; and
at least one processing device, coupled to the memory, operative to implement the following steps:
obtaining sensor data from a first sensor;
applying an anomaly detection technique to detect one or more anomalous sensor values in the sensor data from the first sensor based on additional sensor data from one or more of the first sensor and at least one additional sensor in proximity to the first sensor, wherein a given anomalous sensor value in the sensor data from the first sensor is detected by evaluating (i) a first difference between a first predicted sensor value for the first sensor based at least in part on historical data from the first sensor and a measured sensor value from the first sensor, and (ii) a second difference between a second predicted sensor value for the first sensor based at least in part on at least one measured sensor value from the at least one additional sensor and the measured sensor value from the first sensor; and
correcting at least one of the one or more anomalous sensor values in the sensor data from the first sensor using additional sensor data from one or more of the first sensor and the at least one additional sensor.

11. The system of claim 10, wherein the anomaly detection technique employs a prediction method to detect the anomaly in the sensor data from the first sensor based on the additional sensor data from the first sensor.

12. The system of claim 10, wherein the at least one additional sensor in proximity to the first sensor comprises a plurality of additional sensors that satisfy one or more neighboring criteria with respect to the first sensor and wherein the additional sensor data from the plurality of additional sensors is used to predict the sensor data from the first sensor.

13. The system of claim 10, wherein the first sensor and the at least one additional sensor comprise sensors that have a substantially similar sensor type and a substantially similar sensor location.

14. The system of claim 10, wherein the step of applying the anomaly detection technique to detect the one or more anomalous sensor values in the sensor data further comprises estimating a value of the sensor data from the first sensor based on a predefined source of information.

15. The system of claim 10, wherein the step of correcting the anomalous sensor data is performed substantially close in time to the step of applying the anomaly detection technique to detect the anomaly in the sensor data.

16. A non-transitory machine-readable storage medium having encoded therein executable code of one or more software programs, wherein the one or more software programs when executed by at least one processing device perform the following steps:
obtaining sensor data from a first sensor;
applying an anomaly detection technique to detect one or more anomalous sensor values in the sensor data from the first sensor based on additional sensor data from one or more of the first sensor and at least one additional sensor in proximity to the first sensor, wherein a given anomalous sensor value in the sensor data from the first sensor is detected by evaluating (i) a first difference between a first predicted sensor value for the first sensor based at least in part on historical data from the first sensor and a measured sensor value from the first sensor, and (ii) a second difference between a second predicted sensor value for the first sensor based at least in part on at least one measured sensor value from the at least one additional sensor and the measured sensor value from the first sensor; and correcting at least one of the one or more anomalous sensor values in the sensor data from the first sensor using additional sensor data from one or more of the first sensor and the at least one additional sensor.

17. The computer program product of claim 16, wherein the anomaly detection technique employs a prediction method to detect the anomaly in the sensor data from the first sensor based on the additional sensor data from the first sensor.

18. The computer program product of claim 16, wherein the at least one additional sensor in proximity to the first sensor comprises a plurality of additional sensors that satisfy one or more neighboring criteria with respect to the first sensor and wherein the additional sensor data from the plurality of additional sensors is used to predict the sensor data from the first sensor.

19. The computer program product of claim 16, wherein the first sensor and the at least one additional sensor comprise sensors that have a substantially similar sensor type and a substantially similar sensor location.

20. The computer program product of claim 16, wherein the step of correcting the anomalous sensor data is performed substantially close in time to the step of applying the anomaly detection technique to detect the anomaly in the sensor data.

\* \* \* \* \*

UNITED STATES PATENT AND TRADEMARK OFFICE
CERTIFICATE OF CORRECTION

| | |
|---|---|
| PATENT NO. | : 11,022,469 B2 |
| APPLICATION NO. | : 16/050239 |
| DATED | : June 1, 2021 |
| INVENTOR(S) | : Anat Parush Tzur et al. |

It is certified that error appears in the above-identified patent and that said Letters Patent is hereby corrected as shown below:

On the Title Page

Replace the Title Page with the attached Title Page showing the corrected illustrative figure In the Drawings Replace the 7 Sheets of Drawings with the attached 7 Sheets of Drawings In the Claims Column 15, Line 7, in Claim 17, replace "The computer program product of claim 16," with -- The non-transitory machine-readable storage medium of claim 16, --

Column 15, Line 12, in Claim 18, replace "The computer program product of claim 16," with -- The non-transitory machine-readable storage medium of claim 16, --

Column 15, Line 19, in Claim 19, replace "The computer program product of claim 16," with -- The non-transitory machine-readable storage medium of claim 16, --

Column 15, Line 23, in Claim 20, replace "The computer program product of claim 16," with -- The non-transitory machine-readable storage medium of claim 16, --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*

United States Patent
Parush Tzur et al.

(10) Patent No.: US 11,022,469 B2
(45) Date of Patent: Jun. 1, 2021

(54) CORRECTION OF SENSOR DATA IN A MULTI-SENSOR INTERNET OF THINGS ENVIRONMENT

(71) Applicant: EMC IP Holding Company LLC, Hopkinton, MA (US)

(72) Inventors: Anat Parush Tzur, Beer Sheva (IL); Oshry Ben-Harush, Kibutz Galon (IL); Amihai Savir, Sansana (IL); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 340 days.

(21) Appl. No.: 16/050,239

(22) Filed: Jul. 31, 2018

(65) Prior Publication Data
US 2020/0041316 A1 Feb. 6, 2020

(51) Int. Cl.
*G01D 18/00* (2006.01)
*G01K 15/00* (2006.01)
*G01W 1/02* (2006.01)

(52) U.S. Cl.
CPC .......... *G01D 18/00* (2013.01); *G01K 15/005* (2013.01); *G01W 1/02* (2013.01)

(58) Field of Classification Search
CPC ........ G01D 18/00; G01D 3/022; G01D 3/036; G01D 3/08; G01D 3/10; G01K 15/005; G01K 15/007; G01W 1/02
USPC .................................................. 702/93, 104
See application file for complete search history.

(56) References Cited

U.S. PATENT DOCUMENTS

| | | |
|---|---|---|
| 7,246,024 B2 | 7/2007 | Muramatsu et al. |
| 7,565,229 B2 | 7/2009 | Andres et al. |
| 8,130,094 B2 | 3/2012 | Lu et al. |
| 8,319,623 B2 | 11/2012 | Wallace et al. |
| 8,482,753 B2 | 7/2013 | Urasawa et al. |
| 9,719,866 B2 | 8/2017 | Kobayashi et al. |
| 10,086,782 B1 | 10/2018 | Konrady et al. |
| 10,163,038 B2 | 12/2018 | Wang et al. |
| 10,262,474 B2 | 4/2019 | Gortsas et al. |

(Continued)

OTHER PUBLICATIONS

U.S. Appl. No. 16/024,759 entitled, "Detection of Malfunctioning Sensors in a Multi-Sensor Internet of Things Environment", filed Jun. 30, 2018.

(Continued)

*Primary Examiner* — John H Le
(74) *Attorney, Agent, or Firm* — Ryan, Mason & Lewis, LLP

(57) ABSTRACT

Techniques are provided for correcting sensor data in a multi-sensor environment. An exemplary method comprises obtaining sensor data from a first sensor; applying an anomaly detection technique to detect an anomaly in the sensor data from the first sensor based on additional sensor data from one or more of the first sensor and at least one additional sensor in proximity to the first sensor; and correcting the anomalous sensor data from the first sensor using additional sensor data from one or more of the first sensor and the at least one additional sensor. In some embodiments, additional sensor data from a plurality of neighboring sensors is used to predict the sensor data from the first sensor. The anomalous sensor data is optionally corrected substantially close in time to the detection of the anomaly in the sensor data.

20 Claims, 7 Drawing Sheets

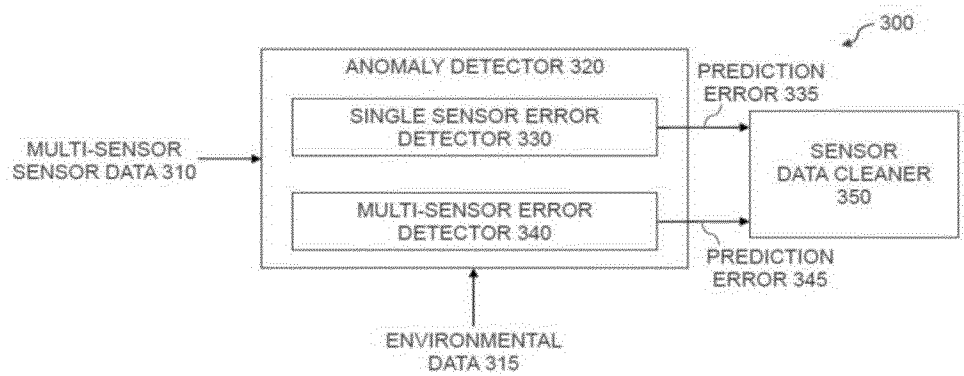

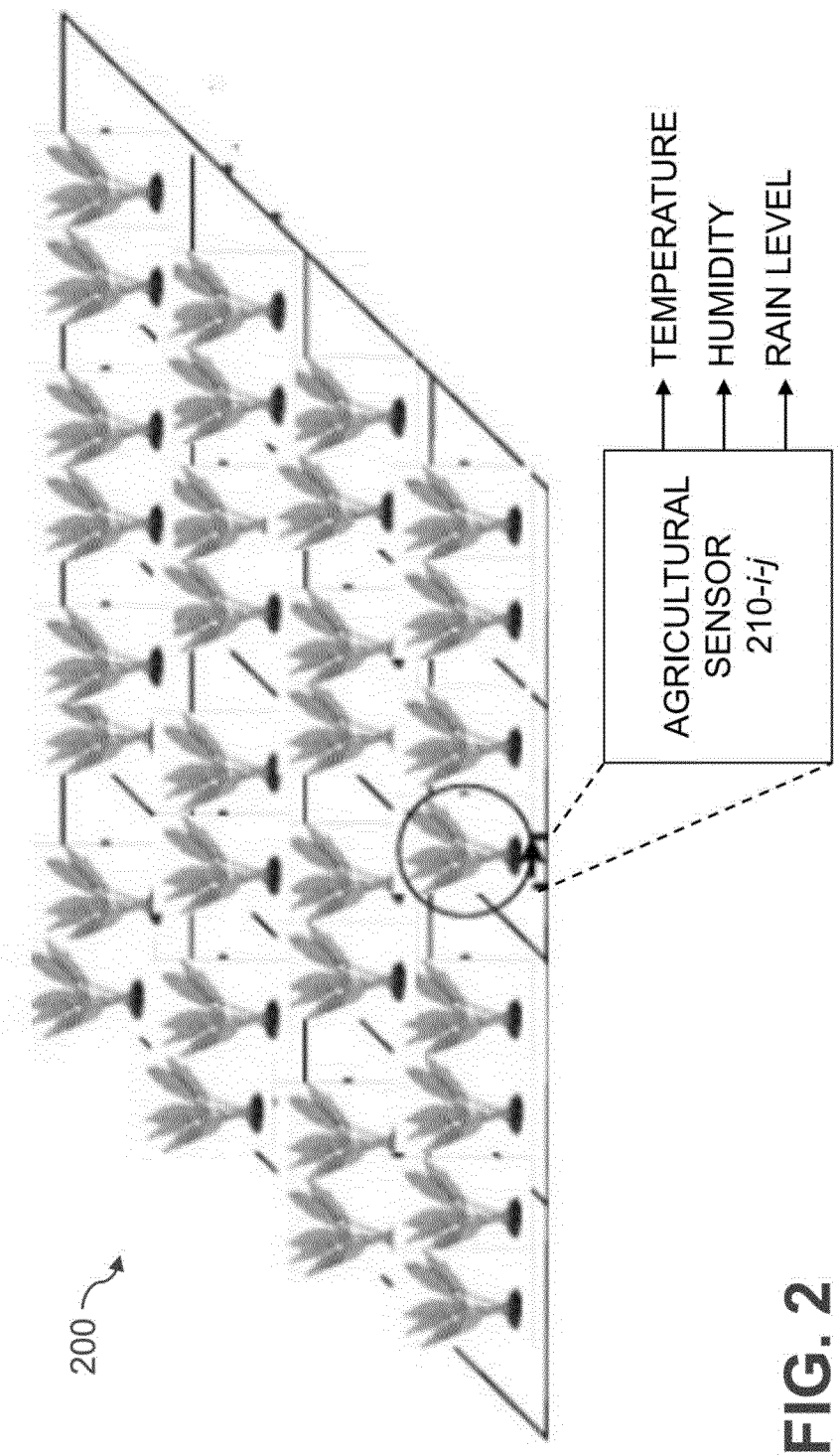

SENSOR DATA CORRECTION POLICY 400

- SIMILAR SENSOR TYPE RULE(S) 410
- PROXIMATE SENSOR RULE(S) 420
- ENVIRONMENTAL KNOWLEDGE SENSOR RULE(S) 430
- MALFUNCTIONING SENSOR HANDLING RULES 440

FIG. 4